United States Patent [19]

Conibear et al.

[11] 3,831,286
[45] Aug. 27, 1974

[54] NAVIGATIONAL APPARATUS
[75] Inventors: David Eustace Conibear, Crowthorne; Maurice Vernon Halls, Wokingham, both of England
[73] Assignee: Sperry Rand Limited, London, England
[22] Filed: June 11, 1973
[21] Appl. No.: 368,894

[30] Foreign Application Priority Data
June 15, 1972 Great Britain.................... 28166/72

[52] U.S. Cl............................ 33/317 R, 33/317 D
[51] Int. Cl............................................. G08g 5/00
[58] Field of Search....... 33/316, 317 D, 317 R, 326; 340/27 R, 27 NA, 210

[56] References Cited
UNITED STATES PATENTS
| 2,524,756 | 10/1950 | Braddon............................ 33/317 R |
| 3,091,127 | 5/1963 | Depp.................................. 33/317 R |
| 3,266,325 | 8/1966 | Schaffer............................ 33/317 R |

FOREIGN PATENTS OR APPLICATIONS
| 690,011 | 4/1953 | Great Britain.................... 33/317 D |

*Primary Examiner*—Ralph D. Blakeslee
*Attorney, Agent, or Firm*—Howard P. Terry

[57] ABSTRACT

The invention provides navigational apparatus in which the power supply for a detector measuring the magnetic heading of the vehicle to which the apparatus is fitted, is effectively isolated from the power supply for other components of the apparatus and is stabilised with the result that the overall accuracy of the apparatus is improved considerably even though the power supply for said other components may be relatively unstable. A preferred arrangement comprises gyroscopic means operable to detect changes in heading of the vehicle and produce an electrical output signal in accordance therewith, drive means operable to drive a shaft of a heading indicator in response to the output signal from the gyroscopic means, a detector operable to measure the magnetic heading of the vehicle and to produce an A.C. output signal in accordance therewith, a demodulator operable to produce a D.C. output signal from the A.C. output signal of the detector, logic circuitry to produce a pulsed output signal in response to the D.C. output signal from the demodulator, and a stepper motor to which is applied the pulsed output signal from the logic circuitry and which drives the shaft of the heading indicator to compensate the latter for changes in the magnetic heading of the vehicle, electrical power for the detector and the demodulator being derived from a first stablized A.C. supply which is effectively voltage and frequency independent of a second A.C. supply for at least the gyroscopic device and the drive means.

11 Claims, 6 Drawing Figures

NAVIGATIONAL APPARATUS

BACKGROUND OF THE INVENTION

1. Field of the Invention

This invention relates to navigational apparatus for a vehicle and more particularly, although not exclusively, to gyro-magnetic compass systems and stabilised platforms for aircraft.

2. Prior Art

In prior art gyro-magnetic compass systems it is always a problem to achieve an acceptable accuracy in the detector as this is often in the form of a flux valve which is highly susceptible to frequency and voltage variations in the electrical supply. As a result, it has been necessary to ensure that components of the compass system requiring electrical power are supplied from a power supply, directly or indirectly, which is not subjected to unduly large variations in frequency and voltage. However, most supplies supplying compass systems, such as those of aircraft, are not highly stable in this respect but have to be tolerated. Another problem is that because the detector is susceptible to frequency variations, it is essential to minimize the possibilities of beat frequencies occurring and to this end, all components of some known compass systems have been supplied from a single power supply as the beat frequency problem tends to have a greater adverse effect on compass system accuracy than the normal variations in frequency and voltage of a power supply. If more than one power supply is used, there is a tendency for cross coupling to occur, with the result that beat frequencies are produced leading to the difficulty mentioned above.

In view of these various difficulties, gyro-magnetic compass systems for aircraft, for example, have been proposed in which the A.C. supply for the whole of the system is stabilized by providing a precision inverter between the main aircraft supply and the compass system. However, such an inverter has to be relatively large in order to meet the necessary power requirements and this gives rise to the well-known problem in aircraft instrument design of size and weight both of which parameters have to be kept to a minimum. In addition, the cost of manufacture of the large inverter is relatively high. These problems may be aggravated by the fact that in such an arrangement it is often desirable to connect other equipment to the same stabilized power supply with consequential degradation in stability due to load fluctuations.

The present invention stems from a realization, resulting from careful study and experimentation, that the accuracy of a gyro-magnetic compass system, for example, is enhanced considerably, and more than expected, if at least the A.C. supply for the detector and any associated demodulator is stabilized. It is not necessary to stabilize the power supply to all the components of the system as previously thought although, of course, this would generally be desirable if it could be effected economically and by means having low volume and weight. Whilst it was known that detectors such as flux valves contributed to inaccuracies due to voltage and frequency variations in the power supply, it was never thought that they were the major contributors in this respect.

However, the realization that once the power supply for the detector is stabilized the system accuracy is increased, even if the power supply to the remaining components is relatively unstable, is not beneficial in all navigational apparatus such as gyro-magnetic compass systems. For example, in gyro-magnetic compass systems in which the items requiring a power supply are not electrically separable in respect of the A.C. components of the power supply it is still essential to stabilize the whole power supply to avoid the aforementioned problem of beating. However, in navigational apparatus in which the detector and any associated demodulator can be isolated electrically from other components requiring a power supply, the present inventive concept can be applied to great advantage without any significant increase in size and weight of the power supply components. It has been found in this connection that if an inverter is used to provide the necessary electrical power for the detector from the main aircraft supply, for example, the size and weight of the inverter is of the order of fifty to one hundred times less than that of an inverter which would have to be used for supplying power to the whole of the system as in the above-discussed known arrangement.

Thus the present invention provides navigational apparatus of greater accuracy using a relatively simple, and hence economic, expedient which does not aggravate the problem of restrictions on size and weight as regards such apparatus intended for use in aircraft. Therefore, the invention constitutes an important advance in the art.

SUMMARY OF THE INVENTION

According to the present invention navigational apparatus comprises a detector operable to measure the magnetic heading of a vehicle to which the apparatus is fitted and to produce an electrical output signal in accordance therewith, and means adapted to receive the detector output signal and drive vehicle heading data transmission means to correct the latter for changes in the magnetic heading of the vehicle, electrical power for the detector being derived from a first stabilised A.C. supply which is effectively voltage and frequency independent of a second A.C. supply for said means.

The means adapted to receive the detector output signal may include a gyroscopic device which is thus slaved to the detector and corrects for changes in the magnetic heading of the vehicle as well as being operable to detect changes in the heading of the vehicle and to drive the heading data transmission means accordingly. Alternatively, said means may comprise logic circuitry operable to produce a pulsed output signal which is applied to a stepper motor which in turn drives the heading data transmission means, which is stabilised in the short term by gyroscopic means.

According to a preferred embodiment of the invention navigational apparatus comprises gyroscopic means operable to detect changes in heading of a vehicle in which the apparatus is fitted and produce an electrical output signal in accordance therewith, drive means operable to drive a shaft of a heading indicator in response to the output signal from the gyroscopic means, a detector operable to measure the magnetic heading of the vehicle and to produce an A.C. output signal in accordance therewith, a demodulator operable to produce a D.C. output signal from the A.C. output signal of the detector, logic circuitry to produce a pulsed output signal in response to the D.C. output signal from the demodulator, and a stepper motor to which is applied the pulsed output signal from the logic circuitry and which drives the shaft of the heading indicator to compensate the latter for changes in the magnetic heading of the vehicle, electrical power for the detector and the demodulator being derived from a first stabilised A.C. supply which is effectively voltage and frequency independent of a second A.C. supply for at least the gyroscopic device and the drive means.

The first and second A.C. supplies may be derived from a common source, such as a main supply of an aircraft in the case of a gyro-magnetic compass system for an aircraft, in which case the first A.C. supply is preferably frequency and voltage stabilised to the extent that variations in frequency and voltage thereof are not greater than half those occurring in the second A.C. supply. The common source, such as the main aircraft supply, may be A.C. or D.C. In each case it is preferable to employ a precision or stabilised inverter as the first A.C. supply, a main A.C. supply being rectified before being applied to the inverter. In this way an accurate first A.C. supply for the detector and demodulator is provided and the variation in voltage and frequency thereof is preferably controlled to better than 20 percent of the variations occurring in the second A.C. supply.

DESCRIPTION OF THE PREFERRED EMBODIMENTS

Figure 1:
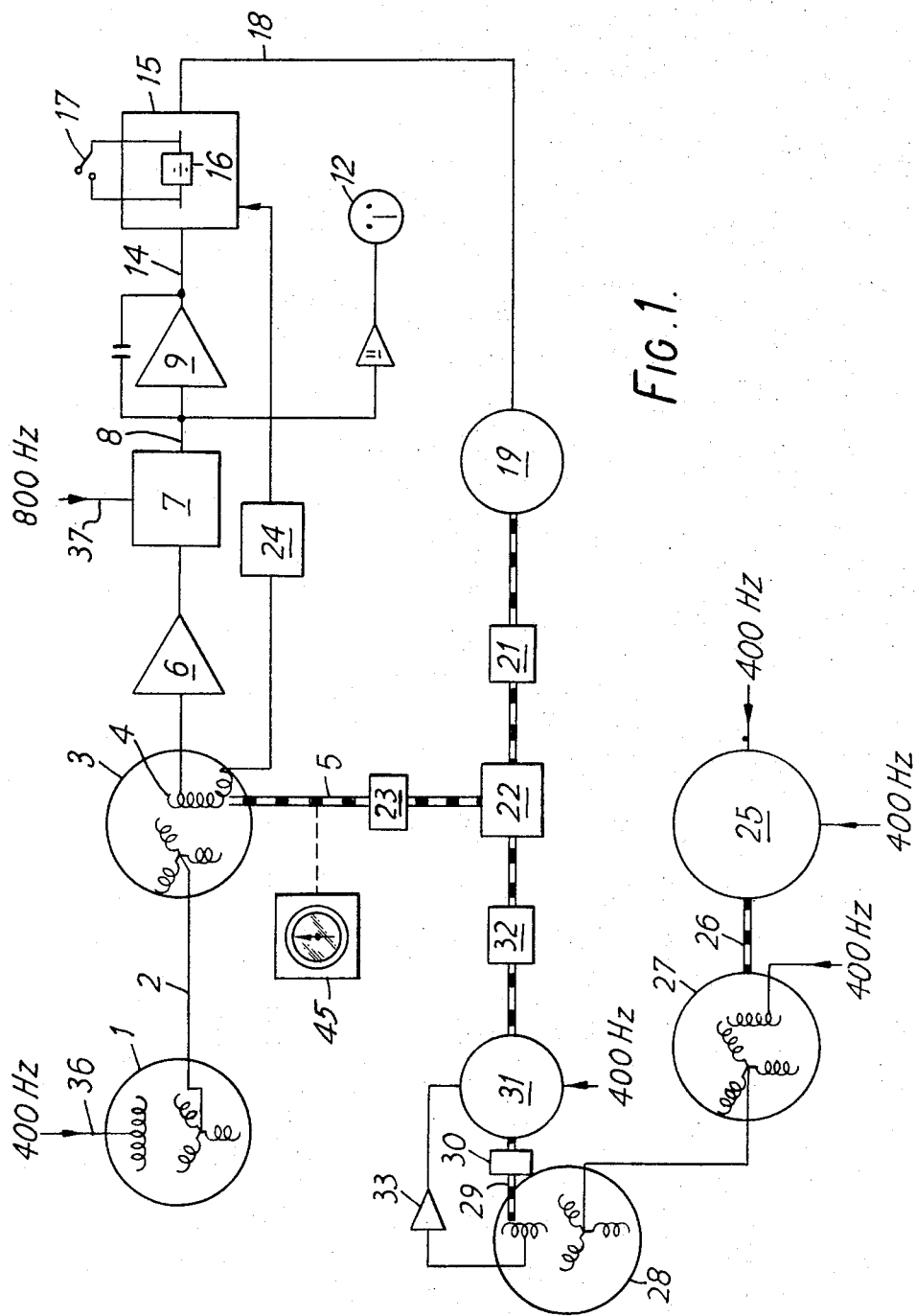
FIG. 1 is a schematic circuit diagram of the compass system.

With reference to FIG. 1, the compass system comprises a detector unit in the form of a flux valve 1 for measuring the magnetic heading of the aircraft. The output 2 of the flux valve 1 is connected to an input rotor of a transolver 3 an output rotor 4 of which is connected to a heading shaft 5 of a heading indicator 45 providing heading data transmission means. The electrical output of the transolver 3 is applied to a preamplifier 6 and the output of the latter is fed to a demodulator 7. In turn, the output 8 of the demodulator 7 is connected both to an integrating amplifier 9 and an annunciator amplifier 11 feeding an annunciator 12 which indicates the state of synchronisation of the compass system as between the heading shaft 5 and the magnetic heading of the aircraft as measured by the flux valve 1.

The integrating amplifier 9 has its output 14 connected to logic circuitry 15 which includes a divide-by circuit 16 shunted by a switch 17. The output 18 of the logic circuitry is connected to a stepper motor 19 which drives the heading shaft 5 through a gearbox 21, a differential gearbox 22 and a further gearbox 23. An automatic gain control loop 24 is provided between the logic circuitry 15 and the output of the transolver 3.

The compass system also includes gyroscopic means in the form of a directional gyroscope 25 which drives a shaft 26 in accordance with changes in heading of the aircraft. The shaft 26 in turn drives a synchro 27 which itself drives a further synchro 28. An output shaft 29 of the synchro 28 is connected to a motor 31 via a gearbox 30 which motor drives the heading shaft 5 through another gearbox 32, the differential gearbox 22, and the further gearbox 23. A servo amplifier 33 is connected between the synchro 28 and the motor 31.

Figure 2:
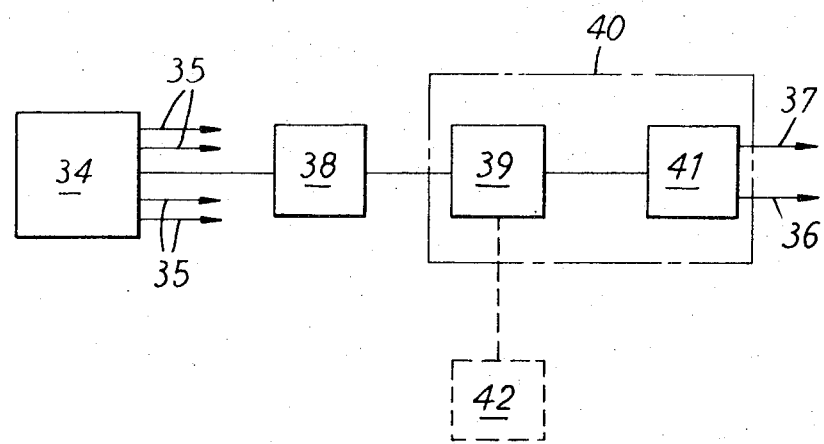
FIG. 2 is a block diagram of the power supplies for the compass system of FIG. 1.

Referring now to FIG. 2, the power supplies for all the components of the compass system are derived from the main A.C. supply 34 for the aircraft having a nominal voltage of 115 volts and a nominal frequency of 400 Hz. The gyroscope 25, the logic circuitry 15 and the various amplifiers and synchros are supplied directly from the main supply 34 as indicated by output lines 35. However, the power supplies for the flux valve 1 (400 Hz) and the demodulator 7 (800 Hz) are supplied on lines 36 and 37, respectively, via a rectifier 38, and an inverter 40 comprising a regulator 39 and an oscillator 41. Alternatively, a separate D.C. supply 42 (which could be another main supply of the aircraft) may be provided from which the power for the flux valve 1 and the demodulator 7 is derived via the inverter 40.

Figure 3:
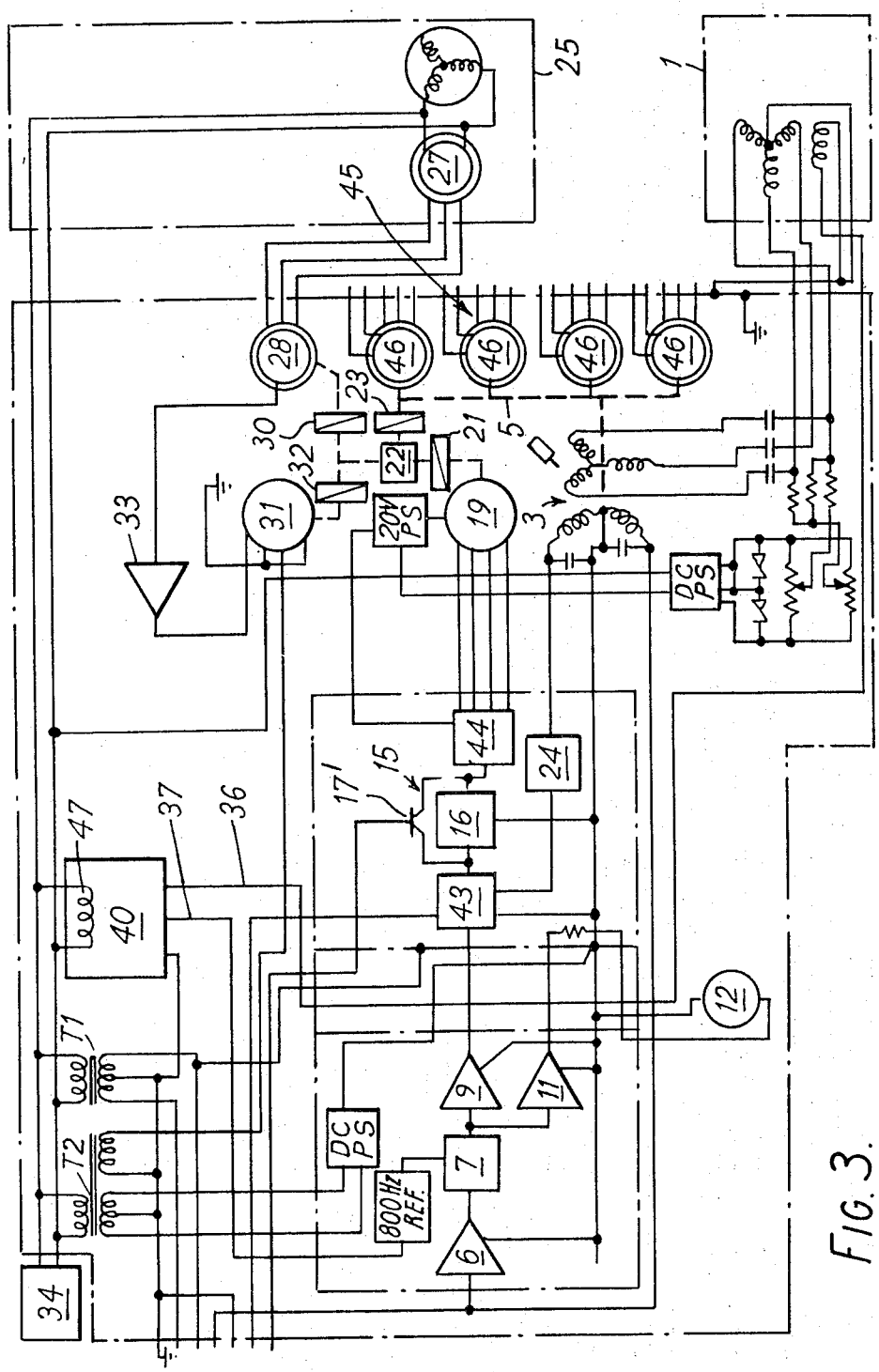
FIG. 3 is a more detailed circuit diagram of the compass system of FIG. 1.

Referring to FIG. 3, the items of FIG. 1 are indentified by similar reference numerals. The main aircraft supply 34 is fed direct to the gyroscope 25 and via transformers T1 and T2 to other components requiring a power supply except the flux valve 1 and demodulator 7 which are supplied via the inverter 40. Some of said other components require a D.C. supply which is derived from the main A.C. supply 34. The logic circuitry 15 comprises a voltage-controlled oscillator 43 and a logic unit 44. The heading indicator is shown generally at 45 in FIG. 3 and comprises four synchros 46 associated with the heading shaft 5, the outputs of which synchros are used to provide indications of heading through means not shown. The gyroscope 25 is not shown in greater detail as it is well known per se.

Figure 4:
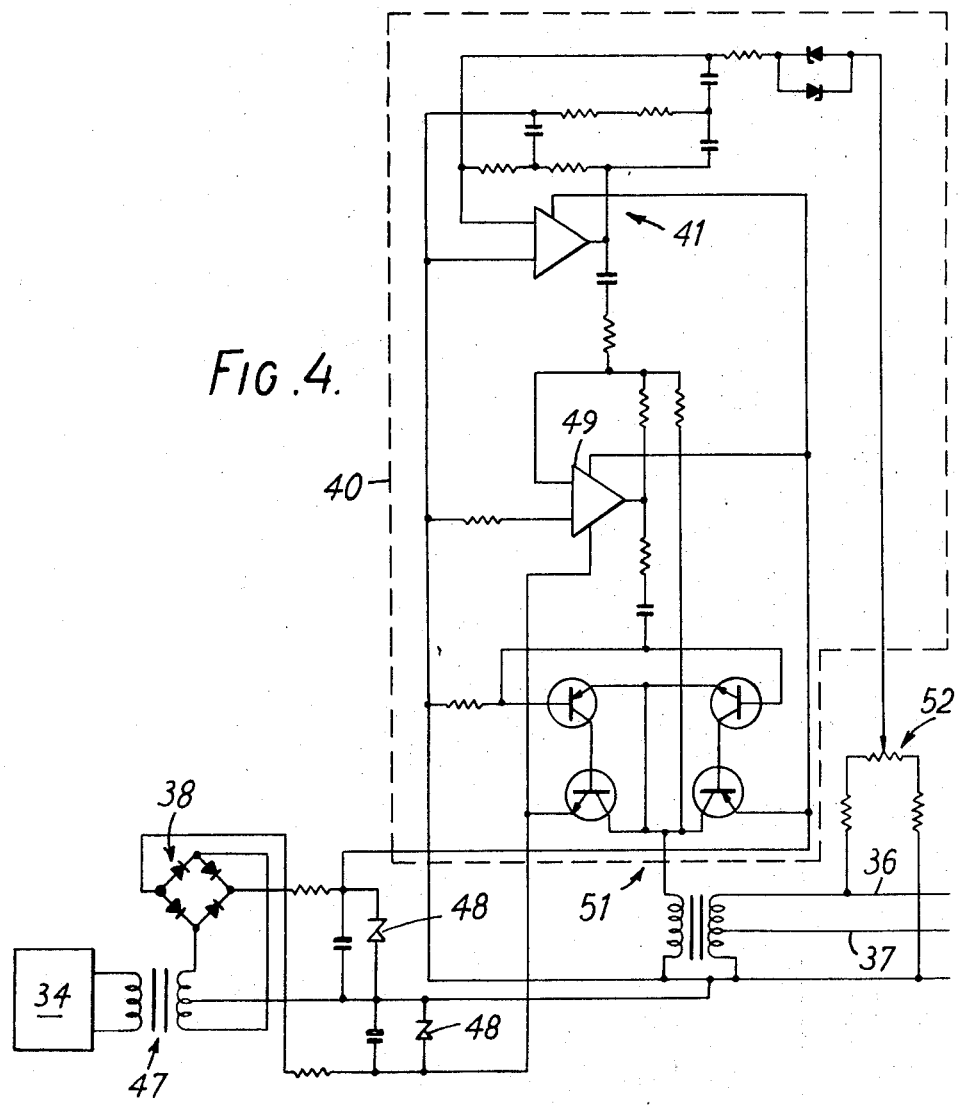
FIG. 4 is a more detailed circuit diagram of part of FIG. 3.

FIG. 4 shows the detailed circuit of the inverter 40 to which the main aircraft supply 34 is applied through a step-down transformer 47. The rectifier 38, with which is associated a conventional smoothing circuit, converts the aircraft A.C. supply 34 to D.C. and the inverter 40 then reconverts this D.C. supply to A.C. which is stabilised. The inverter 40 comprises the regulator 39 which is in the form of two diodes 48 connected as shown and the oscillator 41, as already stated, together with a buffer amplifier 49, a conventional power output circuit indicated generally at 51 and a negative feedback circuit indicated generally at 52.

The main aircraft supply is rectified by the rectifier 38, smoothed and regulated and the resulting D.C. supply fed to the oscillator 41 which is arranged to produce self-oscillation at the required frequency. The oscillator frequency is temperature stabilised and the A.C. output thereof is buffered by the buffer amplifier 49 before being applied to the power output circuit 51. The negative feedback circuit 52 stabilises the output of the inverter 40 as regards voltage and frequency and thus provides a stabilised A.C. supply to the flux valve 1 and the demodulator 7 on lines 36 and 37, respectively. It should be noted that the regulator 39 (the diodes 48) may be dispensed with.

It will be seen that the power supply for the flux valve 1 and the demodulator 7 can be considered as entirely independent from that for the gyroscope 24, etc. as regards voltage and frequency even though it is derived from the same source but this has no adverse effect on the accuracy of the flux valve 1 because the power supply therefore is electrically separable from that for the gyroscope 25, etc. so that there are no problems such as beating which arise in known arrangements referred to hereinbefore. The inverter 40 confines any variation in frequency and voltage of the supply from the rectifier 38 or the D.C. supply 42, as applicable, to an extent such that they are not greater than about half those occurring in the main supply 34. This relationship is based on the normal tolerances in aircraft power supplies and those of other vehicles to which apparatus in accordance with the invention may be fitted. Preferably, the variations referred to are confined to better than 20 percent of those of the main supply 34. With this control of the power supplies to the flux valve 1 and the demodulator 7, the accuracy of the compass system is improved as illustrated in FIG. 5 and 6.

Figure 5:
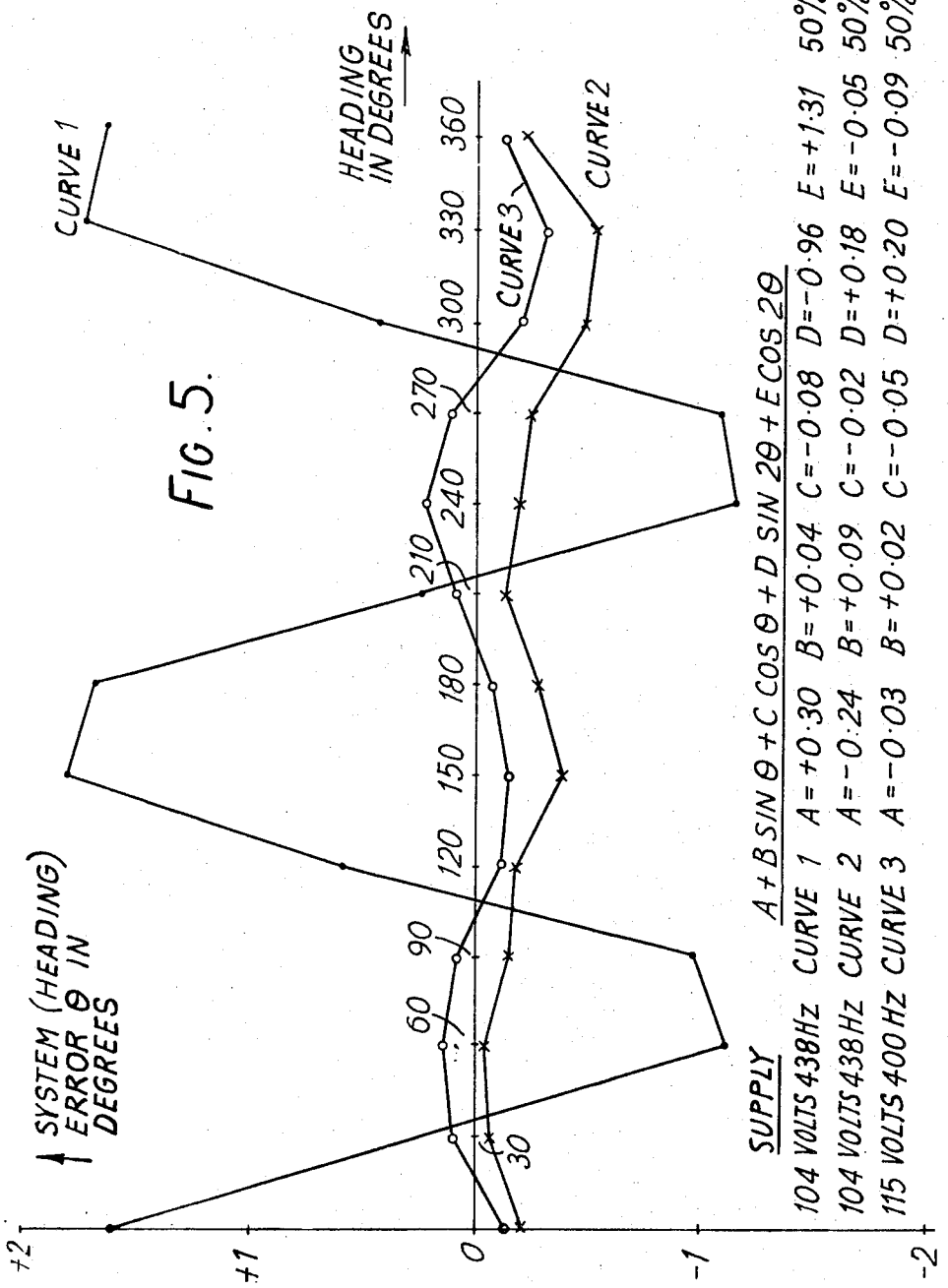
FIGS. 5 and 6 show error curves (error in degrees against heading in degrees) for the compass system of FIG. 1 under varying conditions of power supply voltage and frequency.
Figure 6:
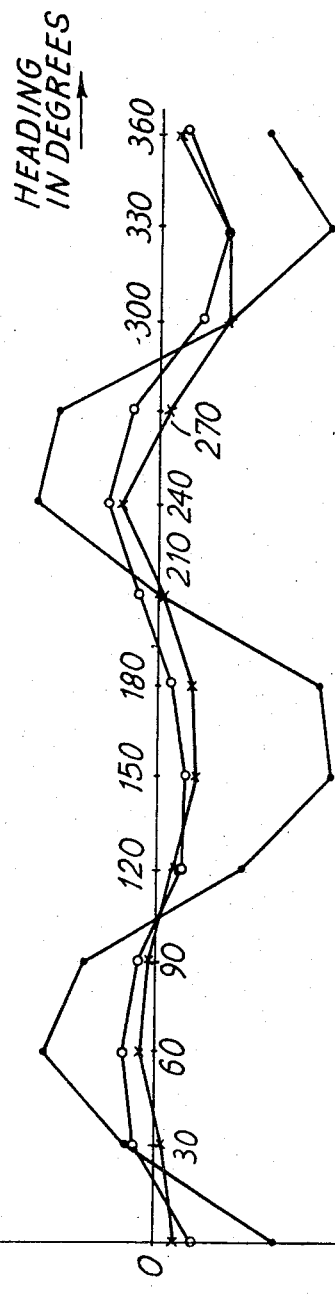

FIG. 5 shows three error curves, curve 1 being obtained from the compass system of FIG. 3 without the power supplies for the flux valve 1 and the demodulator 7 being derived from the inverter 40, i.e., the supplies being derived direct from the main aircraft supply 34, with the main supply varying from the nominal (115 volts, 400 Hz.) at 104 volts, 438 Hz. Curve 2 was obtained with the same variations in the main supply but with the compass system arranged as shown in FIG. 3, i.e., in accordance with the invention. Curve 3 was obtained at nominal supply conditions (115 volts, 400 Hz.) again with the compass system as shown in FIG. 3. Using Fourier analysis to the second cycle error, the three curves gave values of the coefficients A, B, C, D and E as indicated in FIG. 5 and a so-called "50 percent error" or "probable error" value also as indicated.

The coefficients A to E are derived from the Fourier analysis:

$$A + B \sin \theta + C \cos \theta + D \sin 2\theta + E \cos 2\theta$$

where $\theta$ = the heading angle of the aircraft. The "50 percent error" is defined as the error which occupies the middle place among all observation errors arranged in the order of their magnitude, so that the number of errors which are less than the "50 percent error" is the same as the number of errors which exceed it.

FIG. 6 shows three other curves 1 to 3 obtained as in FIG. 5 but with main supply varying to the extent of being at 120 volts and 380 Hz. for curves 1 and 2. The Fourier analysis is also given as in FIG. 5 and from FIGS. 5 and 6 it can be seen that the accuracy of the compass system when arranged in accordance with the invention is much improved in that the variations in the coefficients A to E are low, for variations in main power supply conditions compared with the variations in coefficients obtained without the benefit of the present invention. It will be appreciated that curve 3 in each of FIGS. 5 and 6 will be the same for the compass system irrespective of whether advantage is taken of the invention as it relates to nominal supply.

In operation of the compass system shown in FIGS. 1 and 3, the gyroscope 25 senses changes in heading of the aircraft and drives the heading shaft 5 in accordance therewith through the motor 31 synchros 27, 28 and gearboxes 32, 22, 23. This gives an indication of, and accounts for, any short term changes in aircraft heading. Long-term changes due to variations in the magnetic heading of the aircraft are measured by the flux valve 1 the A.C. output of which is demodulated by the demodulator 7 after passing through the transolver 3 and the pre-amplifier 6. The D.C. output from the demodulator is integrated by the integrating amplifier 9 and fed to the logic circuitry 15 which produces a pulsed output to drive the stepper motor 19, and hence the heading shaft 5, in accordance with the variations in the magnetic heading.

In setting up the compass system ready for use, the switch 17 (normally termed a fast slave switch) is closed whereby the divide-by circuit 16 is shorted out with the result that the frequency of the pulsed output from the logic circuitry 15 is increased so as to increase the rate of drive of the heading shaft 5 effected by the stepper motor 19 to a null position of the shaft. In FIG. 3, the switch 17 comprises a transistor 17'.

The gyroscope 25 may be replaced by a stabilised platform.

What we claim is:

1. Vehicle mounted navigation apparatus comprising detector means operable to measure the magnetic heading of said vehicle and producing an electrical output signal in accordance therewith,
   heading data transmission means coupled to said detector means for indicating heading of said vehicle,
   means including demodulator means responsive to said electrical output signal from said detector means and coupled to said heading data transmission means for providing output signals in accordance with the difference between said measured magnetic heading of said vehicle and said indicated heading of said vehicle,
   means coupled to said heading data transmission means and responsive to said difference output signals for driving said heading data transmission means to provide a corrected indicated heading of said vehicle in accordance with said measured magnetic heading,
   first A.C. power supply means for providing electrical power to said navigation apparatus, and
   second A.C. power supply means for providing stabilized electrical power to said detector means and said demodulator means whereby said stabilized electrical power is effectively voltage and frequency independent of said electrical power from said first A.C. power supply means.

2. Vehicle mounted navigation apparatus as recited in claim 1 further including a gyroscopic device coupled to said data transmission means thereby being slaved to said detector means and being operable to detect changes in the heading of said vehicle and providing output electrical signals in accordance therewith which are coupled to said heading data transmission means to drive said heading data transmission means accordingly.

3. Vehicle mounted navigation apparatus as recited in claim 2 in which said means for providing difference output signals includes logic circuitry coupled to a stepper motor whereby said logic circuitry produces a pulsed output signal in response to said difference output signals that is applied to said stepper motor for driving said heading data transmission means which is short term stabilized by said gyroscopic means.

4. Vehicle mounted navigation apparatus comprising gyroscopic means for detecting the changes in heading of said vehicle and producing an electrical output signal in accordance therewith, heading indicator means, data transmission means including a shaft coupled to said heading indicator means, drive means responsive to said output signal from said gyroscopic means and coupled to said shaft for driving said shaft in response to the output signal from said gyroscopic means, detector means for measuring the magnetic heading of said vehicle and producing an A.C. output signal in accordance therewith, demodulator means coupled to said detector means for producing a D.C. output signal from said A.C. output signal of said detector means, logic circuit means coupled to said demodulator means for producing a pulsed output signal in response to said D.C. output signal from said demodulator means, a stepper motor coupled between said logic circuit means and said heading data transmission means for driving said shaft to compensate for changes in magnetic heading of said vehicle, first A.C. power supply means for providing electrical power at least for said gyroscopic device and said drive means and second stabilized A.C. power supply means for providing electrical power to said detector means and said demodulator means which is effectively voltage and frequency independent of said electrical power from said first A.C. power supply means.

5. Vehicle mounted navigation apparatus as recited in claim 4 which further includes a common power source for providing power to said first and second A.C. power supply means.

6. Vehicle mounted navigation apparatus as recited in claim 5 in which said common power supply source is a source of A.C. power and further includes converter means for converting said A.C. power into D.C. power and said first and second A.C. power supply means are coupled to said converter means.

7. Vehicle mounted navigation apparatus as recited in claim 5 in which said common power supply source includes a D.C. power supply.

8. Vehicle mounted navigation apparatus as recited in claim 4 in which said second stabilized A.C. power supply means includes means for limiting variations in frequency and voltages of said second stabilized A.C. power supply means to within one-half of the variations in frequency and voltage present in said first A.C. power supply means.

9. Vehicle mounted navigation apparatus as recited in claim 8 in which said second stabilized A.C. power supply means includes means for limiting variations in frequency and voltage to less than 20 per cent of those occurring in said first A.C. power supply means.

10. Vehicle mounted navigation apparatus as recited in claim 4 in which said second stabilized A.C. power supply means includes stabilized inverter means.

11. Vehicle mounted navigation apparatus as recited in claim 4 in which said detector means includes a flux valve.

* * * * *